United States Patent
Sexton et al.

(10) Patent No.: US 10,657,028 B2
(45) Date of Patent: May 19, 2020

(54) METHOD FOR REPLICATING PRODUCTION BEHAVIOURS IN A DEVELOPMENT ENVIRONMENT

(71) Applicant: MASTERCARD INTERNATIONAL INCORPORATED, Purchase, NY (US)

(72) Inventors: Conor Sexton, Dublin (IE); Mark Whelan, Dublin (IE); Richard Lynch, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/154,891

(22) Filed: Oct. 9, 2018

(65) Prior Publication Data

US 2019/0114246 A1 Apr. 18, 2019

(30) Foreign Application Priority Data

Oct. 13, 2017 (EP) .................................. 17196493

(51) Int. Cl.
*G06F 11/36* (2006.01)
*G06F 21/62* (2013.01)

(52) U.S. Cl.
CPC ........ *G06F 11/366* (2013.01); *G06F 11/3612* (2013.01); *G06F 11/3636* (2013.01);
(Continued)

(58) Field of Classification Search
CPC .............. G06F 11/366; G06F 11/3612; G06F 11/3636; G06F 11/3644; G06F 11/3664; G06F 21/6254
(Continued)

(56) References Cited

U.S. PATENT DOCUMENTS

| 6,219,803 B1 * | 4/2001 | Casella ................... H04L 29/06 714/38.13 |
| 9,588,871 B1 * | 3/2017 | Estes, Jr. .................. G06F 8/73 |

(Continued)

FOREIGN PATENT DOCUMENTS

EP 2 597 573 A1 5/2013

OTHER PUBLICATIONS

"Search Report Issued in European Application No. EP 17 19 6493", dated Mar. 29, 2018, 8 pages.
(Continued)

*Primary Examiner* — Ryan D. Coyer
(74) *Attorney, Agent, or Firm* — Talem IP Law, LLP (57) ABSTRACT

A method is described for diagnosing errors within a production environment software platform that is arranged to process transaction messages and to store transaction history data related to processed transactions in a production database. The stored transaction history data comprises transaction objects that have been generated as the production environment software platform processes transaction messages. The method comprises detecting an error in a series of transaction messages processed by the production environment software platform, receiving the transaction history from the production database, the transaction history comprising a plurality of transaction objects, and configuring a development environment software platform to match the configuration of the production environment software platform at the start of the transaction history. The method further comprises running the development environment software platform with the received transaction history, and running a log file module to determine a source for the detected error.

17 Claims, 5 Drawing Sheets

(52) U.S. Cl.
CPC ...... *G06F 11/3644* (2013.01); *G06F 11/3664* (2013.01); *G06F 21/6254* (2013.01)

(58) Field of Classification Search
USPC .......................................................... 717/131
See application file for complete search history.

(56) References Cited

U.S. PATENT DOCUMENTS

| | | | | |
|---|---|---|---|---|
| 2005/0102572 A1* | 5/2005 | Oberlaender | ....... | G06F 17/5022 |
| | | | | 714/29 |
| 2013/0139003 A1* | 5/2013 | Patwardhan | ........ | G06F 11/3684 |
| | | | | 714/32 |
| 2013/0325828 A1* | 12/2013 | Larson | ................ | G06F 16/2365 |
| | | | | 707/703 |
| 2016/0342499 A1* | 11/2016 | Cheng | ................. | G06F 11/3644 |

OTHER PUBLICATIONS

"International Search Report and Written Opinion Issued in PCT Application No. PCT/US2018/053298", dated Jan. 10, 2019, 11 Pages.

\* cited by examiner

ERROR Caused by: com.mastercard.risk.rds.flextp.exception.PluginException: MQMessagingDao | initialize{ Failed to connect :

420 at com.mastercard.risk.rds.flextp.io.mq.MQMessagingDao.initialize(MQMessagingDao.java:726)

at com.mastercard.risk.rds.flextp.plugin.filter.rbd.duplicatefilter.MQEventDupCheckFilter.initialize(MQEventDupCheckFilter.java:119)

at com.mastercard.risk.rds.flextp.plugin.filter.rbd.duplicatefilter.MQEventDupCheckFilter.filter(MQEventDupCheckFilter.java:172)

Figure 4

DEBUG com.mastercard.risk.rds.flextp.io.mq.MQMessagingDao : Queue Manager Name[KEMSA01P],Queue Name[RDS.DUPCHECK.CLUSTER10],Host[rsk2ksc97],Channel[TO.EMS.SVRCONN.01],Port[14403],MQ Operation[1],Destination Queue Manager(s)[null],Queue Manager Names For Distribution Names For Distribution[null],IsAvailable[true],MQEnvironment.hostname[rsk2ksc97],MQEnvironment.channel[TO.EMS.SVRCONN.01],MQEnvironment.port[null],

410

510

420

520

ERROR Caused by: com.mastercard.risk.rds.flextp.exception.PluginException: MQMessagingDao | initialize | Failed to connect ;

at com.mastercard.risk.rds.flextp.io.mq.MQMessagingDao.initialize(MQMessagingDao.java:726)

at com.mastercard.risk.rds.flextp.plugin.filter.rbd.duplicatefilter.MQEventDupCheckFilter.initialize(MQEventDupCheckFilter.java:119)

at com.mastercard.risk.rds.flextp.plugin.filter.rbd.duplicatefilter.MQEventDupCheckFilter.filter(MQEventDupCheckFilter.java:172)

Figure 5

METHOD FOR REPLICATING PRODUCTION BEHAVIOURS IN A DEVELOPMENT ENVIRONMENT

TECHNICAL FIELD

The present disclosure relates to a method for replicating production behaviours in a development environment. In particular, but not exclusively, the present disclosure relates to a method, a computing device, a computer program product and to a computer-readable storage medium.

BACKGROUND

One of the most common and time-consuming difficulties in software development is testing and debugging; yet testing and debugging code is an essential part of the process as it ensures that the product is working as intended. However, it is possible for bugs to be present in the production environment, which contains live data, even once the code has been through a significant amount of testing and debugging.

Debugging code that has entered the production environment is a nuisance for developers, production support and quality assurance. Although many bugs and issues can nevertheless be identified through detailed analysis of the code, it is not always sufficient or even possible to do so. For example, time-sensitive issues related to deadlock on a database—a state in which each member of a group of actions is waiting for another member to release a lock—and time-sensitive message volumes that affect threading models are particularly difficult to debug.

Current techniques for dealing with errors that occur in the production environment include logging, analysing all behaviours, reproducing the error, and running through the code itself. Often the developer relies on user feedback on the usability of the software. Current approaches therefore do not provide a way of debugging and testing code that is causing a production issue to ensure a fluid consumer experience when transactions are rejected or declined.

Therefore there is scope for improvement on current approaches.

The present disclosure has been devised to mitigate or overcome at least some of the above-mentioned problems.

BRIEF SUMMARY

Aspects and embodiments of the disclosure are set out in the accompanying claims.

According to an aspect of the present disclosure there is provided a method for diagnosing errors within a production environment software platform that is arranged to process transaction messages and to store transaction history data related to processed transactions in a production database. The stored transaction history data comprises transaction objects that have been generated as the production environment software platform processes transaction messages. The method comprises detecting an error in a series of transaction messages processed by the production environment software platform, receiving the transaction history from the production database, the transaction history comprising a plurality of transaction objects, and configuring a development environment software platform to match the configuration of the production environment software platform at the start of the transaction history. The method further comprises running the development environment software platform with the received transaction history, and running a log file module to determine a source for the detected error.

The detecting step of the method—in which an error is detected in a series of transaction messages—may occur in either the production environment or the development environment. For example, an error may be detected in the production database, or the development platform may receive a message from the production environment and detect an error in the production messages on the basis of the received message. The receiving step—in which the transaction history is received from the production database—may be carried out in the development environment.

The method may comprise obfuscating transaction object data from transaction history.

The configuring step may comprise associating a transaction object with a transaction message.

The configuring step may comprise reformatting the transaction object to match the transaction message format within the production environment software platform.

The log file module may comprise a debugging level.

The debugging level may be set to different modes, where a higher mode may show more information about the message.

The higher mode may show how the transaction message was received.

The higher mode may show what caused the problem in the production environment software platform.

The log file module may be run in a replicated development environment software.

According to an aspect of the present disclosure there is provided a computing device adapted for diagnosing errors within a production environment software platform, the computing device comprising at least one processor and at least one memory and a means to process transaction messages and to store transaction history data related to processed transactions in a production database. The stored transaction history data comprises transaction objects that have been generated as the production environment software platform processes transaction messages. The computing device is adapted to detect an error in a series of transaction messages processed by the production environment software platform, and to receive the transaction history from the production database, the transaction history comprising a plurality of transaction objects. The computing device is further adapted to configure a development environment software platform to match the configuration of the production environment software platform at the start of the transaction history, to run the development environment software platform with the received transaction history, and to run a log file module to determine a source for the detected error.

According to an aspect of the present disclosure there is provided a computer program product for diagnosing errors within a production environment software platform that is arranged to process transaction messages and to store transaction history data related to processed transactions in a production databased. The stored transaction history data comprises transaction objects that have been generated as the production environment software platform processes transaction messages. The computer program product comprises instructions that, when the program is executed by a computer, cause the computer to detect an error in a series of transaction messages processed by the production environment software platform and receive the transaction history from the production database, wherein the transaction history comprises a plurality of transaction objects. The computer program product further comprises instructions that, when the program is executed by a computer, cause the computer to configure a development environment software platform to match the configuration of the production environment software platform at the start of the transaction history, run the development environment software platform with the received transaction history, and run a log file module to determine a source for the detected error.

According to an aspect of the present disclosure there is provided a computer-readable storage medium for diagnosing errors within a production environment software platform that is arranged to process transaction messages and to store transaction history data related to processed transactions in a production databased, the stored transaction history data comprising transaction objects that have been generated as the production environment software platform processes transaction messages. The computer-readable storage medium comprises instructions which, when executed by a computer, cause the computer to detect an error in a series of transaction messages processed by the production environment software platform, receive the transaction history from the production database, the transaction history comprising a plurality of transaction objects, and configure a development environment software platform to match the configuration of the production environment software platform at the start of the transaction history. The computer-readable storage medium further comprises instructions which, when executed by a computer, cause the computer to run the development environment software platform with the received transaction history, and run a log file module to determine a source for the detected error. The computer-readable storage medium is any suitable storage medium that does not consist of propagating signals.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the disclosure will now be described, by way of example only, with reference to the accompanying drawings, in which like components are assigned like numerals and in which.

DETAILED DESCRIPTION

A method for replicating production behaviours in a development environment in accordance with an embodiment of the disclosure is shown in FIGS. 1 to 5.

Figure 1:
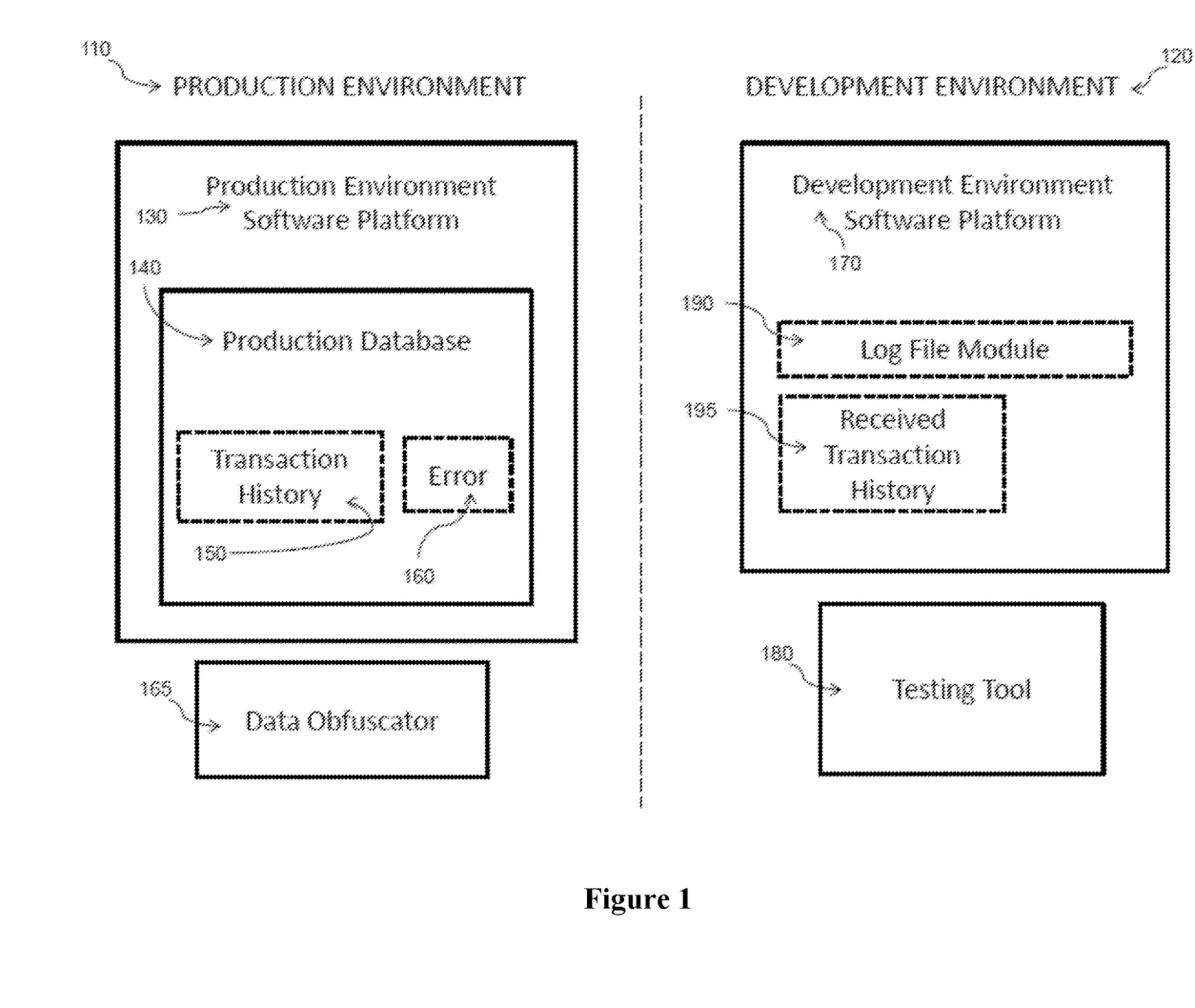
FIG. 1 is a block diagram to describe the structure of the production environment and the development environment, in accordance with an embodiment of the disclosure.

FIG. 1 is a block diagram showing the structure of a production environment 110 and a development environment 120, in accordance with an embodiment of the disclosure. The production environment 110 comprises a production environment software platform 130 that supports a production database 140. The production environment software 130 is arranged to process transaction messages within a financial transaction network and to store transaction related data objects within the production database.

The production database is arranged to store data relating to processed transactions, i.e. transaction histories 150, including card details, transaction amounts, parties to a transaction, transaction time etc. and also authorization codes and transaction error codes. The production database is therefore essentially arranged to store an entire record of transactions processed within the production environment. The production database may also be arranged to store the configuration details of the software platform over time. In the event of an error 160 in the production environment, the user may be notified. The error informs the user that there has been a failure, but it does not provide enough information to develop potential solutions. Alternatively, a non-production based clone of the development environment may be maintained that has the same configuration settings as the production database and this clone database may be used for testing. As a further alternative, configuration details may be requested from the production environment so that the development environment may be configured in the same way as the production environment.

The production environment also contains a data obfuscator 165, which can be used to obfuscate cardholder details from transaction data when exporting data from the production database.

The development environment 120 comprises a development environment software platform 170 that can be used to emulate the environment in the production environment software platform. The development environment software platform 170 provides a mechanism for software developers to test new functionality and debug problems in existing functionality.

The development environment 120 additionally comprises a testing tool 180 for generating transaction messages from transaction objects. The development environment software platform 170 also comprises the received transaction history 195, received from the development environment, and a log file module 190 for storing log files received from the production environment and analyzing the cause of errors within the software platform. The log file module 190 may comprise log files that a developer may be able to review to identify possible causes and to attempt to apply fixes. The log file module 190 may further comprise a data store for storing received transaction objects such as transaction history data.

The development environment (comprising the development environment software platform 170, the testing tool 180 and the log file module 190) can be used to replicate errors in the production environment and therefore enable the identification and investigation of bugs and errors.

Figure 2:
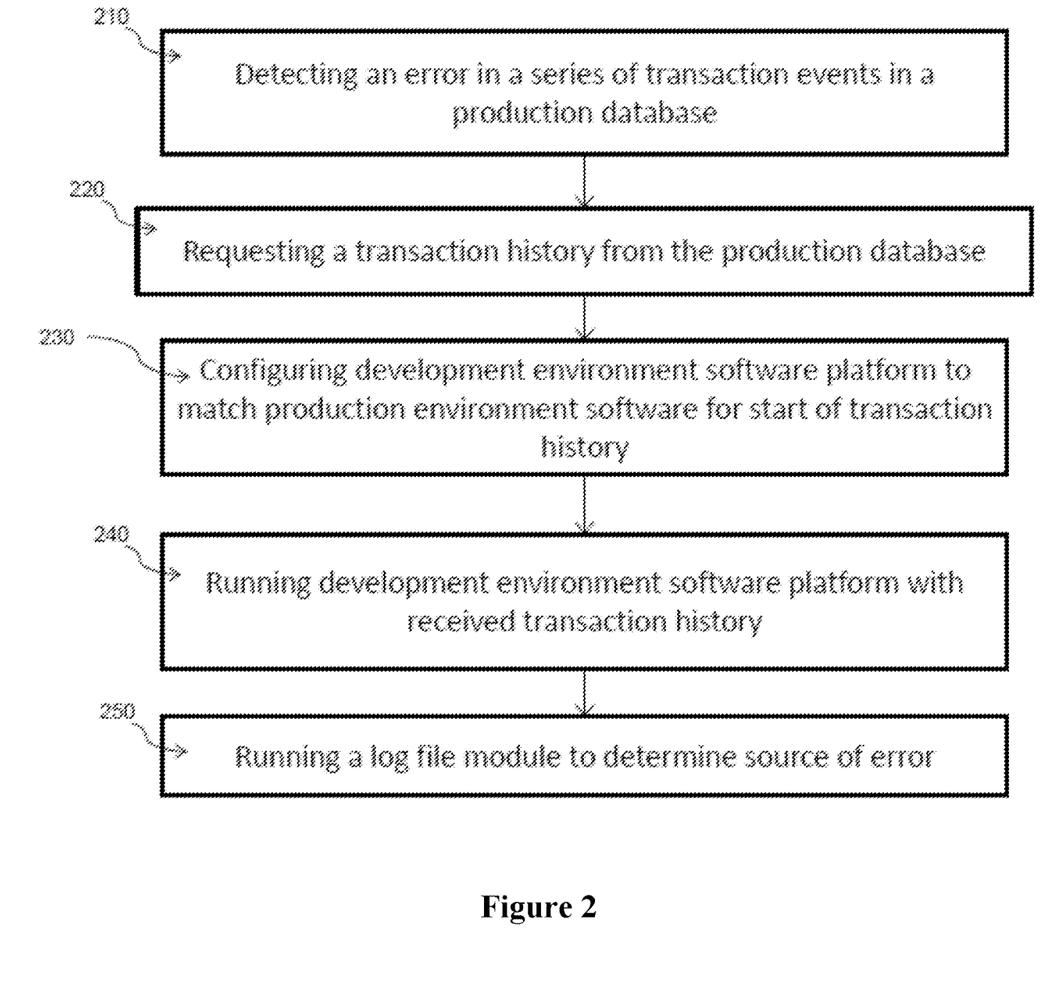
FIG. 2 is a flow chart of the processes in the method for replicating production behaviours in a development environment, in accordance with an embodiment of the disclosure.

FIG. 2 is a flow chart showing the processes in the method for replicating production behaviours in a development environment 120, in accordance with an embodiment of the disclosure.

An error 160 in a series of transaction events is detected 210 in a production database 140. It is noted that when an error 160 occurs within the production environment, a log file comprising the word "error" is generated (described further with reference to FIG. 4 below). The error may, therefore, conveniently be detected by analyzing the log files for instances of the word "error". Such analysis may be performed by a suitable monitoring program within the production environment 110 or via third party software that analyses the log files. When an error has been detected, a notification email may be sent to the user. Further, the log data within a specified window of time, for example a ten minute window either side of the time of the error, is captured for analysis by the developer. The log data may be captured in a file format such as, for example, a .txt file. The log files may be retained for a specified time period, for example 24 hours. Once the specified time period has expired, a new log file may be created whereby the new log file would include an up-to-date timestamp, and the previous log file may be archived.

The transaction history 150 (which comprises a series of transaction objects) is subsequently requested 220 from the production database 140. The transaction history data may be requested for a time period between a first (start) time (before the error occurred) to a second time (after the error occurred).

The requested extract of the transaction history data from the production database 140 is then sent to the data store in the development environment software platform 170. The development environment software platform 170 is configured 230 to match the production environment software 130 for the start of the transaction history. Additionally configuration details (e.g. database records) of the production environment software platform 130 are also sent to the data store.

The testing tool 180 within the development environment software platform 170 is then arranged to access the data store and is configured to format the received transaction objects (within the transaction history data extract) to replicate the transaction messages that would have been received by the production environment software platform 130. The development environment software platform 170 is additionally configured to match the configuration of the production environment software platform 130 as it appeared at the start of the transaction history data extract.

The development environment software platform 170 is then run 240 with the reformatted transaction messages in the received transaction history 195. A log file module 190 is then run 250 to analyze the source of errors in the processing of transaction messages. It is noted that the log file module 190 may be arranged to output more detailed log files than those available within the production environment. Due to memory storage limitations the production environment logs may only provide a basic/simple level of detail. For example, a basic level log may include errors and warnings only. An example of a basic level log is described below with reference to FIG. 4.

Within the development environment, however, only a relatively short window of reformatted transaction messages needs to be processed by the development environment software 170. As a result the log file module 190 may be arranged to output detailed log files in which every part of every operation carried out by the development environment software is logged. For example, the content of the transaction messages in the system may be extracted at a checkpoint by checkpoint basis, which is not possible in the production environment as the number of log records produced would exceed the space available. The development environment logs may provide a bulk log file or a full level log file. A bulk log file may comprise debugging information to enable a developer to determine where the issues lies, as well as errors and warnings. A full level log file may comprise every detail logged by an application. A full level log file provides a 'higher' log level than a bulk log file, whereas both a full level log file and a bulk log file provide a 'higher' log level than a basic level log. An example of a full level log file is described below with reference to FIG. 5.

Figure 3:
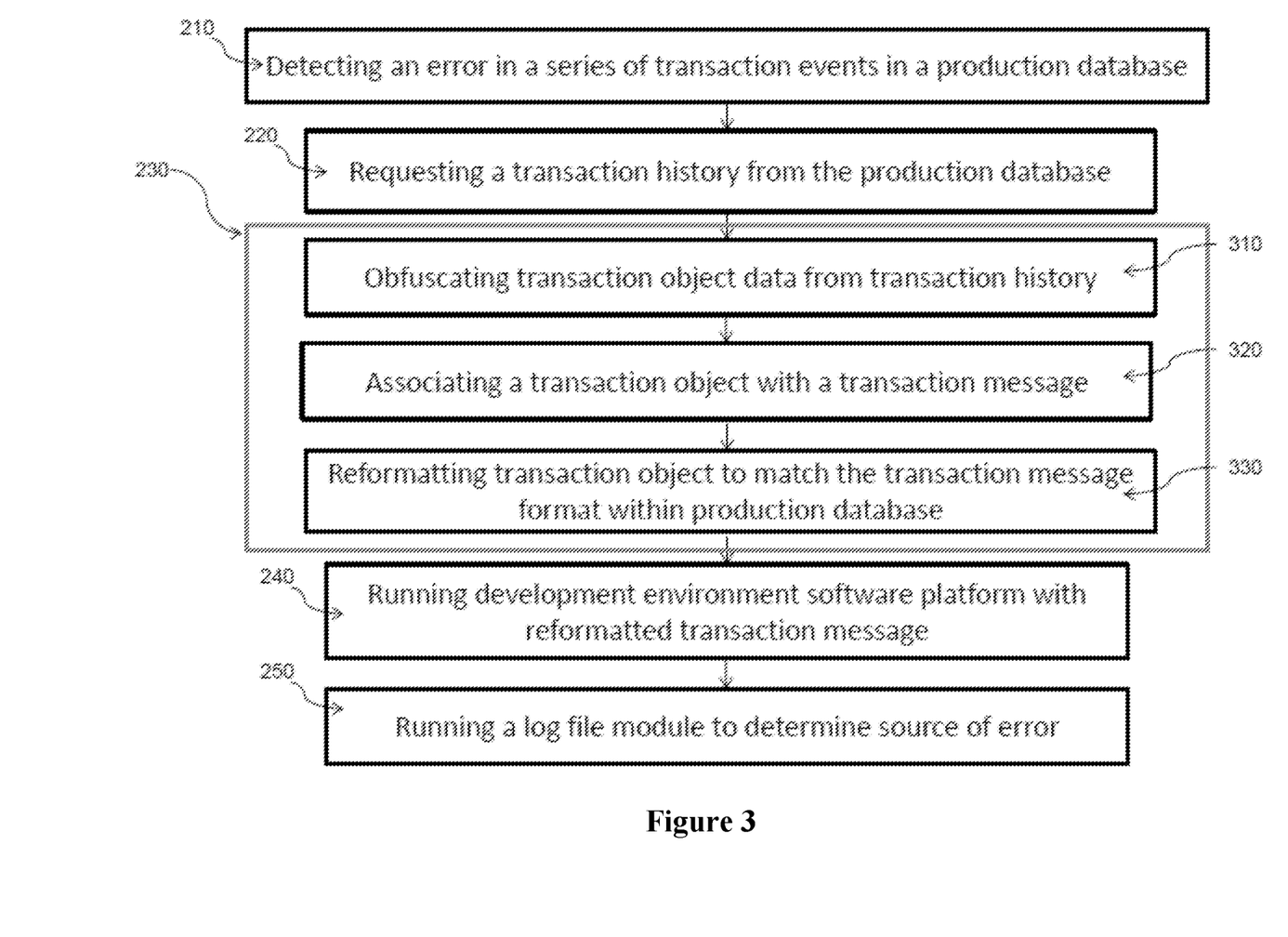
FIG. 3 shows the flow chart of FIG. 2 with an expansion of the description of the step for configuring the development environment software platform, in accordance with an embodiment of the disclosure.

FIG. 3 shows the flow chart of FIG. 2 with an expansion of the description of the step for configuring 230 the development environment software platform 170, in accordance with an embodiment of the disclosure.

Firstly, an error in a series of transaction events is detected 210 in a production database, and the transaction history (which comprises a series of transaction objects) is requested 220 from the production database.

Prior to sending the transaction history to the data store within the development environment transaction object data within the transaction history is processed to obfuscate 310 personal cardholder information from the transaction history. For example, Personal Identifiable Information (PII), which can be used to identify an individual's identity, and Payment Card Industry Data Security Standard (PCI DSS) compliance data are examples of data that can be obfuscated.

As part of the step of configuring the development environment software platform, transaction objects within the received transaction history extract are associated 320 by the testing tool with a transaction message and reformatted 330 to replicate transaction messages that would have been received by the production environment software platform. Steps 320 and 330 in combination describe the recreation of the transaction messages. This recreation may involve converting the database format, by for example parsing the database records, into an object or message format that is acceptable in the production system. Reformatted transaction messages may then be sent to the development environment and the development environment software platform is then run 240 with the reformatted transaction messages. In order to determine the source of error, a log file module 250 is run from within the development environment software platform.

Figure 4:
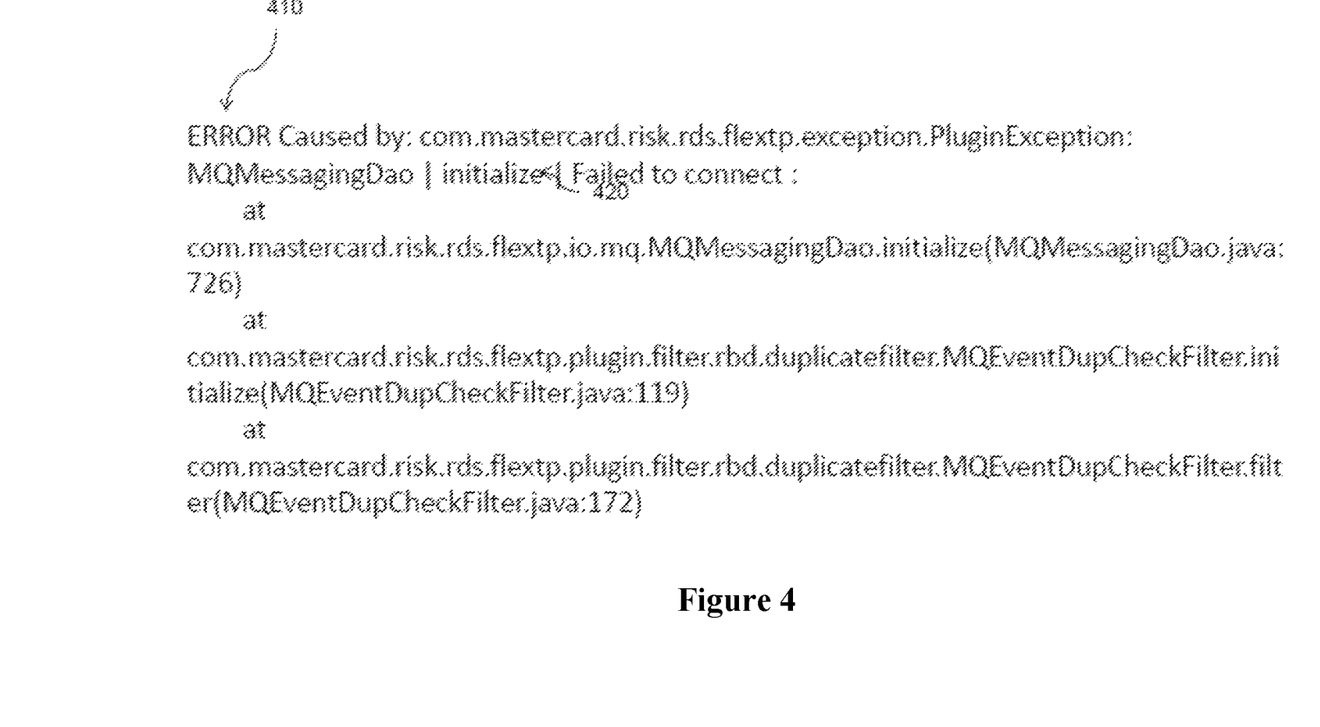
FIG. 4 is an example of an error in the production environment.

FIG. 4 is an example of a basic level log file in the production environment. The basic level log file provides an indication of errors 410 and/or warnings only. It informs the user that there has been a failure 420 but it does not provide enough information to develop potential solutions.

Figure 5:
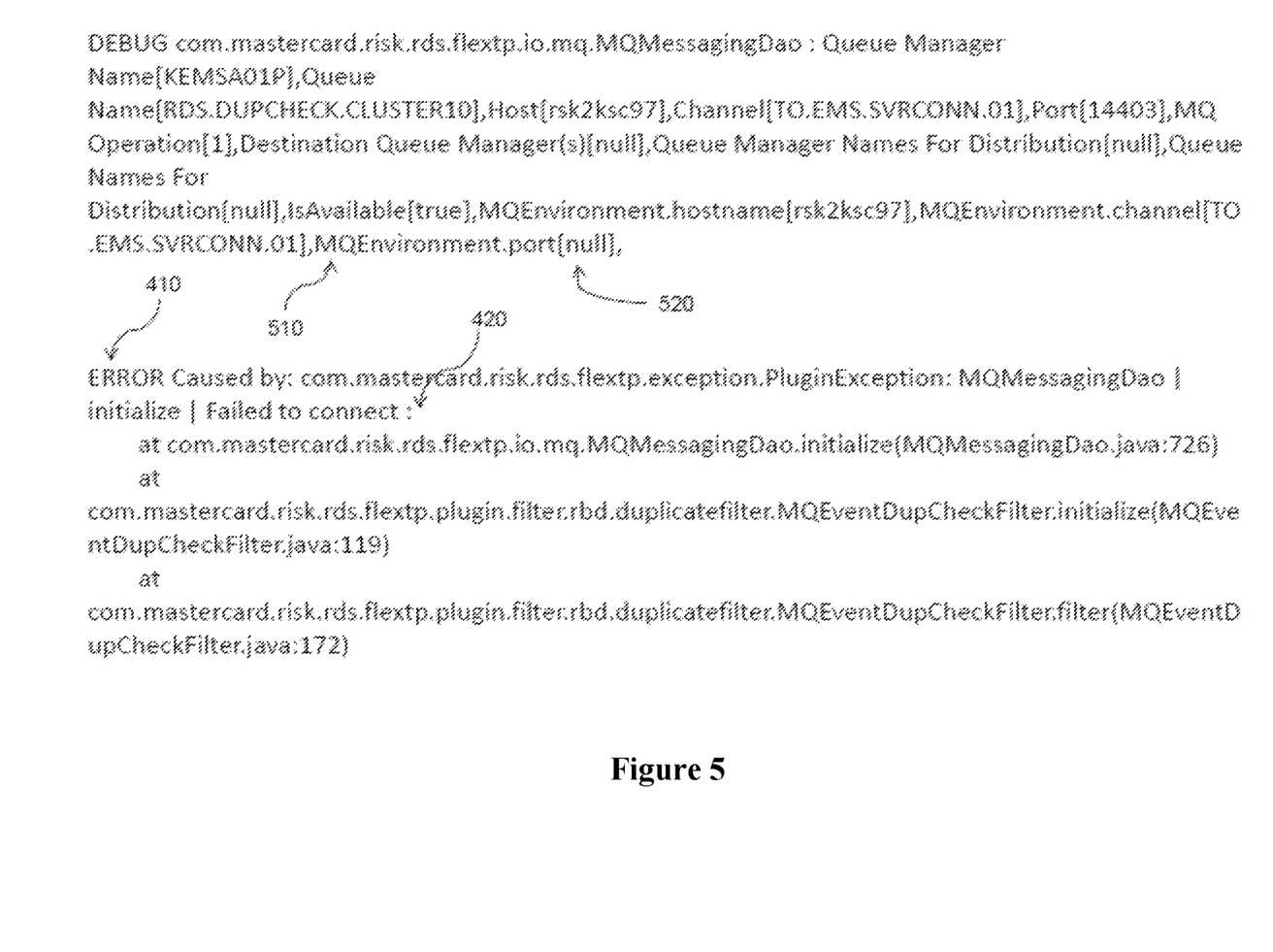
FIG. 5 is an example of a log file outputted by the log file module in the development environment software platform.

FIG. 5 is an example of a full level log file outputted by the log file module 190 in the development environment software platform 170. The log enables the source of the error 410 resulting from the failure 420 to be determined. In this example, it can be seen that the Message Queue (MQ) is the cause of the error. The MQ 510 refuses to connect because some of its parameters are null 520. Other parameters may be submitted to indicate the result. This error could be caused by the component not being initialized with the correct configuration data, or alternatively, a user making an error while changing configuration data. Once this type of error is identified in the full logging level, corrective action may be taken. In this case, the configuration data is fixable in the production environment by, for example, altering the appropriate database settings. Depending on the error, the issue may require new code generation followed by a full production deployment.

The invention claimed is:

1. A method for diagnosing errors within a production environment software platform that is arranged to process transaction messages and to store transaction history data related to processed transactions in a production database, the stored transaction history data comprising transaction objects that have been generated as the production environment software platform processes transaction messages, the method comprising:
   detecting an error in a series of transaction messages processed by the production environment software platform;
   receiving the transaction history data from the production database, the transaction history data comprising a plurality of transaction objects;
   reformatting the plurality of transaction objects within the received transaction history data to replicate the transaction messages processed by the production environment software platform;
   configuring a development environment software platform to match a configuration of the production environment software platform at a start of transaction history;
   running the development environment software platform with the replicated transaction messages; and
   running a log file module to determine a source for the detected error.

2. The method of claim 1 further comprising obfuscating transaction object data from the transaction history data.

3. The method of claim 1 wherein the configuring step comprises associating a transaction object with a transaction message.

4. The method of claim 1 wherein the log file module comprises a debugging level.

5. The method of claim 4 wherein the debugging level comprises different modes, where a higher mode of the different modes shows more information about a transaction message.

6. The method of claim 5 wherein the higher mode shows how the transaction message was received.

7. The method of claim 6 wherein the higher mode shows what caused a problem in the production environment software platform.

8. The method of claim 5 wherein the higher mode shows what caused a problem in the production environment software platform.

9. The method of claim 1 wherein the log file module is run in a replicated development environment software.

10. A computing device adapted for diagnosing errors within a production environment software platform, comprising at least one processor and at least one memory, wherein the computing device executes instructions stored in the at least one memory to:
    detect an error in a series of transaction messages processed by the production environment software platform;
    receive transaction history from a production database, the transaction history comprising a plurality of transaction objects;
    reformat the plurality of transaction objects within the received transaction history to replicate the transaction messages processed by the production environment software platform;
    configure a development environment software platform to match a configuration of the production environment software platform at a start of the transaction history;
    run the development environment software platform with the replicated transaction messages; and
    run a log file module to determine a source for the detected error.

11. The computing device of claim 10, wherein the instructions stored in the at least one memory further directs the computing device to: obfuscate transaction object data from the transaction history.

12. The computing device of claim 10 wherein the instructions to configure the development environment software platform direct the computing device to: associate a transaction object with a transaction message.

13. A computer-readable storage medium comprising instructions stored thereon for diagnosing errors within a production environment software platform that is arranged to process transaction messages and to store transaction history data related to processed transactions in a production database, the stored transaction history data comprising transaction objects that have been generated as the production environment software platform processes transaction messages, wherein the instructions, when executed by a computer, direct the computer to:
    detect an error in a series of transaction messages processed by the production environment software platform;
    receive the transaction history data from the production database, the transaction history data comprising a plurality of transaction objects;
    reformat the plurality of transaction objects within the received transaction history data to replicate the transaction messages processed by the production environment software platform;
    configure a development environment software platform to match a configuration of the production environment software platform at a start of transaction history;
    run the development environment software platform with the replicated transaction messages; and
    run a log file module to determine a source for the detected error.

14. The computer-readable storage medium of claim 13, wherein the instructions further direct the computer to: obfuscate transaction object data from the transaction history data.

15. The computer-readable storage medium of claim 13 wherein the instructions to configure the development environment software platform direct the computer to: associate a transaction object with a transaction message.

16. The computer-readable storage medium of claim 13 wherein the log file module comprises a debugging level.

17. The computer-readable storage medium of claim 16 wherein the debugging level comprises different modes, where a higher mode of the different modes shows more information about a transaction message.

* * * * *